United States Patent
Kaiser et al.

[11] Patent Number: 5,909,986
[45] Date of Patent: Jun. 8, 1999

[54] BORING HEAD WITH SIMULTANEOUS CLAMPING

[75] Inventors: Heinz Kaiser, Wallisellen; Dieter Pape, Rümlang, both of Switzerland

[73] Assignee: Heinz Kaiser AG, Rumlang, Switzerland

[21] Appl. No.: 08/848,958

[22] Filed: May 2, 1997

[30] Foreign Application Priority Data

May 2, 1996 [CH] Switzerland ............................ 1109/96

[51] Int. Cl.$^6$ .................................................. B23B 29/10
[52] U.S. Cl. ........................... 408/181; 408/143; 408/185
[58] Field of Search ................................. 408/143, 181, 408/185, 147, 150, 151, 153; 409/141; 279/129, 130; 82/1.2, 1.4, 131

[56] References Cited

U.S. PATENT DOCUMENTS 5,101,700  4/1992  Muth .......................................... 82/131
5,611,651  3/1997  Wohlhaupter et al. ................. 408/143

FOREIGN PATENT DOCUMENTS

| 35 10 259 C2 | 6/1990 | Germany . |
| 39 26 026 A1 | 2/1991 | Germany . |
| 42 42 063 C2 | 2/1995 | Germany . |
| 01171707 | 7/1989 | Japan . |

Primary Examiner—Steven C. Bishop
Attorney, Agent, or Firm—Weiser and Associates, P.C.

[57] ABSTRACT

The boring head has a fine movement mechanism for the tool support and a counterweight mounted in the tool body. In order to compensate for imbalance during the adjustment of the cutting tool, the counterweight is moved automatically in the opposite direction by means of a transmission device. The tool support, the counterweight, and the setting screw of the fine movement mechanism can all be simultaneously clamped firmly to the clamping organ.

27 Claims, 3 Drawing Sheets

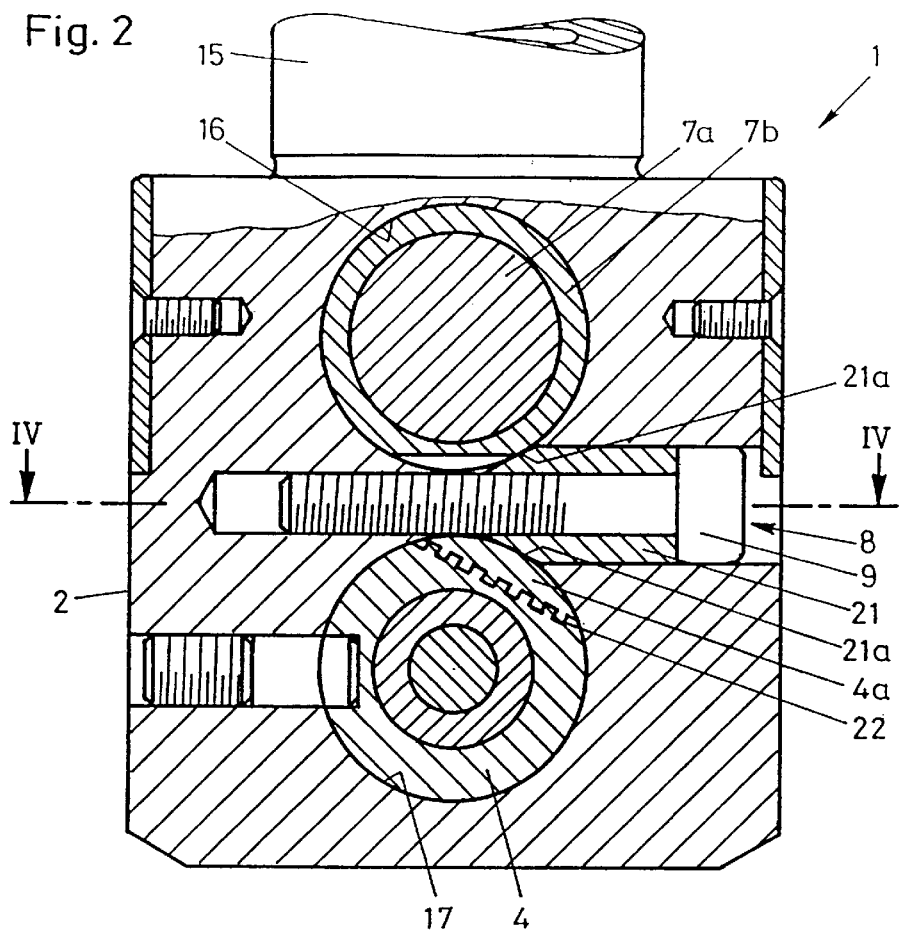
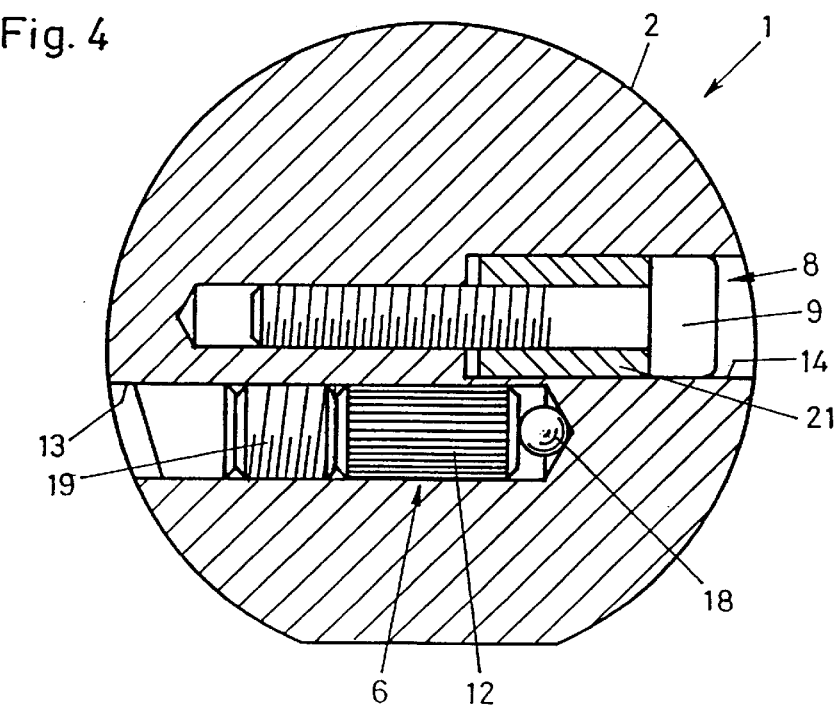

BORING HEAD WITH SIMULTANEOUS CLAMPING

BACKGROUND OF THE INVENTION

1. Field of the Invention

The present invention relates to boring heads for rotary tools, and, in particular, to boring heads with imbalance compensation.

2. Description of the Related Art

Boring heads with a fine adjustment mechanism for the tool support and a counterweight mounted in the tool body for imbalance compensation are used primarily for machining bores with close tolerances and, for this purpose, can be mounted in a spindle driven in rotation. Current technical development is now aimed at using increasingly better and above all harder and more heat-resistant cutting materials and at operating at increasingly higher revolutions per minute (rpm). Since movable single-edge boring heads are not rotationally symmetrical due to their design, they will be imbalanced to a greater or lesser degree. This can cause vibrations in the machining system which have an unfavorable effect on the bores. In particular, the dimensional accuracy and shaping precision as well as the surface quality suffer due to such vibrations. In addition, the service life of the cutting material is strongly reduced.

The state of the art includes numerous proposals for compensating for the imbalance on a boring head. For example, German Patent No. DE-C 35 10 259 discloses a rotating fine boring head for a tool machine in which, on the circumference of the tool head, two weights are mounted which are connected by a cable line and are moved via a graduated ring.

German Patent No. DE-C 42 42 063 discloses a boring tool in which automatic imbalance compensation is provided. For this purpose, a two-armed transmission lever is mounted in the tool body which, with one arm, engages a driving carriage and, with the other arm, a tool carriage. Upon the displacement of the driving carriage, the tool carriage is also moved in the opposite direction. The imbalance compensation here takes place automatically and depends on the diametral displacement.

The present invention has the objective of designing a boring head of the type mentioned above which is especially well suited for high rotation speeds and makes a more compact design possible. Further aspects and advantages of this invention will become apparent from the detailed description which follows.

SUMMARY OF THE INVENTION

The present invention is directed to a boring head, comprising (a) a tool body; (b) a fine adjustment mechanism for adjusting position of a tool support; (c) a counterweight, mounted in the tool body; (d) a transmission device, adapted to automatically move the counterweight in an opposite direction upon movement of the tool support by the fine adjustment mechanism to provide imbalance compensation; and (e) a clamping organ adapted to simultaneously clamp the tool support and the counterweight.

BRIEF DESCRIPTION OF THE DRAWINGS

Other aspects, features, and advantages of the present invention will become more fully apparent from the following detailed description, the appended claims, and the accompanying drawings in which:

FIG. 2 shows a section along line II—II of FIG. 1;

FIG. 4 shows a section along line IV—IV of FIG. 2; and

DETAILED DESCRIPTION

The present invention relates to a boring head with a fine adjustment mechanism for the tool support and a counterweight mounted in the tool body which, during the movement of the cutting tool, is moved automatically and oppositely by a transmission device for imbalance compensation. Boring heads according to embodiments of the present invention comprises a chucking device with which the tool support and the counterweight can be simultaneously and firmly clamped in. This assures that the movable counterweight as well as the movable tool support can be precisely fixed in the chosen setting. The inadvertent spontaneous movement of these parts due to centrifugal forces and high rotation speeds is thereby reduced and possibly even avoided. Since both of the parts mentioned above are simultaneously clamped in, a single chucking process is sufficient. This permits a relatively simple and compact design.

According to certain embodiments of the present invention, the precision movement mechanism can also be clamped in. In this way, all moving parts can be fixed in place by a single clamping process when the setting is selected.

According to an especially simple implementation of the invention, the clamping device has a screw that engages between the counterweight and the tool support and can be applied to the counterweight and the tool support at the same time. This makes an especially compact design possible, and requires the movement of only one screw for the clamping process. The counterveight and the tool support can then be mounted a relatively short distance from each other in the tool body.

According to certain embodiments of the present invention, the transmission of motion between the tool support and the counterweight is provided by a cog roller that is rotatably mounted in the tool body and meshes with the counterweight and the tool support. This transmission device is very simple and space saving and also contributes to a very compact design of the boring head.

Preferred embodiments of boring heads according to the present invention have a defined operating range, where the imbalance ratios are known in each setting and are essentially compensated for by the correspondingly positioned counterweight. Since the transmission of motion requires little space, the tool support can be made relatively large, which is advantageous for reasons of stability. The relatively great imbalance arising as a result of the movement of the tool support is preferably compensated by a counterweight having a heavy metal core.

Figure 1:
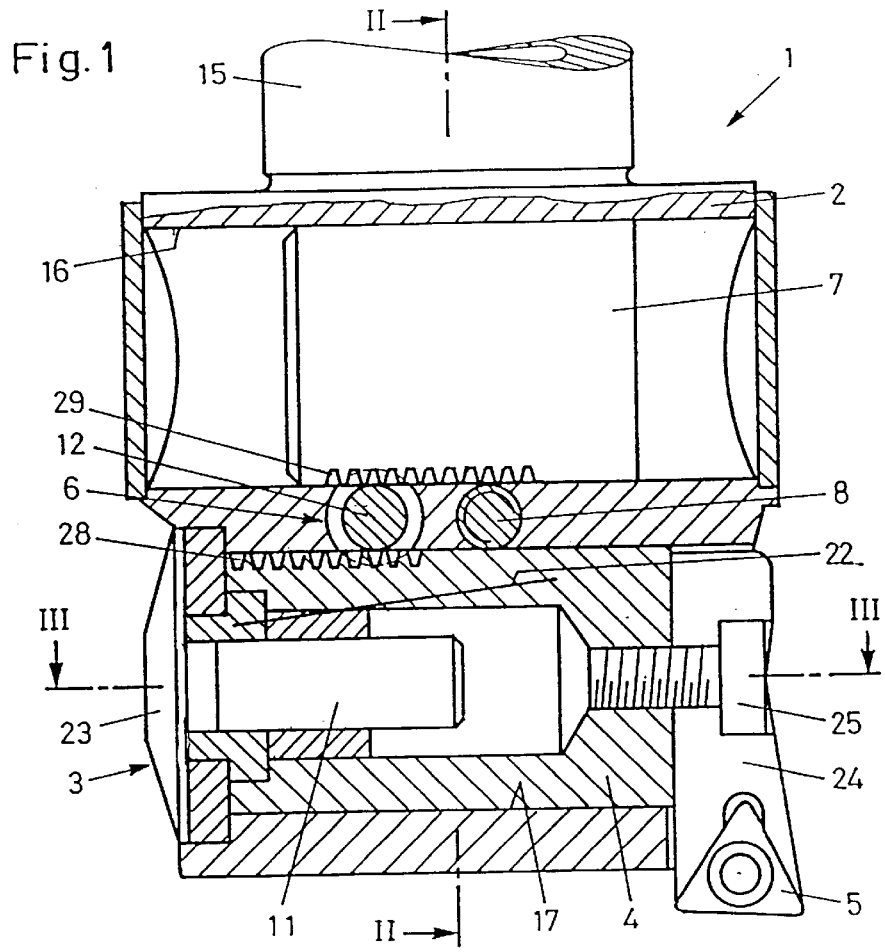
FIG. 1 shows a partially cut-away view of a boring head, according to one embodiment of the present invention.
Figure 3:
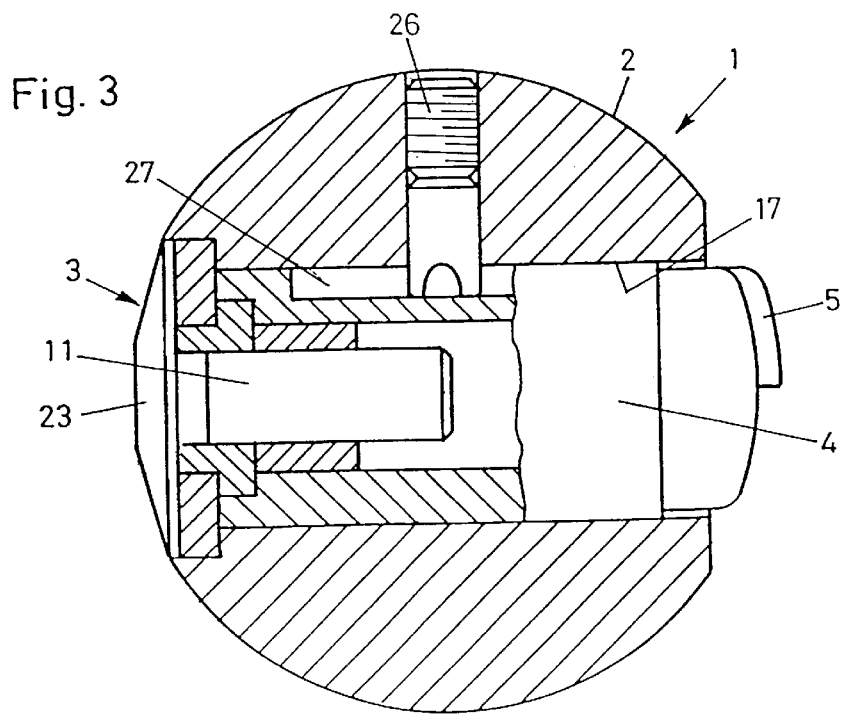
FIG. 3 shows a section along line III—Ill of FIG. 1.

FIGS. 1–4 show various views of boring head 1, according to one embodiment of the present invention. FIG. 1 shows a partially cut-away view of boring head 1; FIG. 2 shows a section along line II—II of FIG. 1; FIG. 3 shows a section along line III—III of FIG. 1; and FIG. 4 shows a section along line IV—IV of FIG. 2.

Boring head 1 has tool body 2 in which tool support 4 is mounted. Tool support 4 is capable of moving within cross bore 17. The movement is controlled by fine movement mechanism 3, which has graduated scale 23 connected to setting screw 11. The fine movement mechanism can be designed essentially according to Swiss Patent No. CH-A 641 706. Holder 24 for reversing cutting plate 5 is mounted unshakably on tool support 4 opposite graduated scale disk 23 by fixation screw 25. By rotating setting screw 11, tool support 4 can be displaced with holder 24 in bore 17 thereby changing the effective working diameter.

The imbalance arising during the movement of tool support 4 is compensated by the counter-movement of counterweight 7, which is mounted in cross bore 16 in tool body 2. The transmission of the motion of tool support 4 to counterweight 7 takes place via transmission device 6, which has cog roller 12 which is rotatably mounted in cross bore 13 in the tool body. As shown in FIG. 4, the mounting takes place with ball 18 and hinge pin 19. Cog roller 12 meshes with toothing 28 of tool support 4 and toothing 29 of counterweight 7. Tool support 4 is capable of limited movement, which, as shown in FIG. 3, is provided by side recess 27 which acts as a path limiter in which pin 26 engages.

In FIG. 1, tool support 4 is shown in the left end position. If it is pushed outward by rotating the setting screw, then cog roller 12 rotates in the counterclockwise direction and moves counterweight 7 the same distance in the opposite direction. The weight of counterweight 7 is matched to that of tool body 4 with support 24 and the other parts moving with it. In each movement position of tool support 4, therefore, boring head 1 is statically balanced as a whole. In order for counterweight 7 to have the same weight as tool support 4 with screwed-on holder 24 at the smallest possible volume, the counterweight is provided with heavy metal core 7a which is pressed into sleeve 7b.

All moveable parts are fixed by chucking organ 8 after a movement is executed. Chucking organ 8 has chucking screw 9 with sleeve-shaped clamping part 21 and is inserted into graduated bore 14. Screw 9 engages in the threading of tool body 2 in the bottom part of graduated bore 14. On the inner end of chuck sleeve 21, wedge-shaped clamping surfaces 21a are fashioned which can be applied to the outside of counterweight 7 and tool support 4 at the same time by rotating chucking screw 9. FIG. 2 shows the position of clamping part 21 in which surfaces 21a are applied in the manner mentioned above. Counterweight 7 as well as tool support 4 are therefore locked in with respect to tool body 2 and secured against inadvertent movements.

As shown in FIGS. 1 and 2, an obliquely running slot 22 is machined into tool support 4. As shown in FIG. 2, it runs at a slant toward the longitudinal direction of chucking screw 9 and is positioned in such a way that part 4a lying outside of slot 22 of tool support 4 lies opposite clamping organ 8. If clamping part 21 is applied to tool support 4, part 4a is moved slightly by the force acting on it, corresponding to the width of slot 22, against setting screw 11. This relatively short motion suffices to clamp setting screw 11 firmly and therefore also to fix it. Clamping organ 8, therefore, simultaneously fixes counterweight 7, tool support 4, and setting screw 11. To release this fixation, clamp screw 9 is moved, in FIG. 2, by rotation to the right. The clamping is released and tool support 4 can now be adjusted for another diameter setting as mentioned above. As shown in FIGS. 1 and 2, the distance between counterweight 7 and tool support 4 is essentially the same as the diameter of clamping screw 9 and therefore relatively small.

Figure 5:
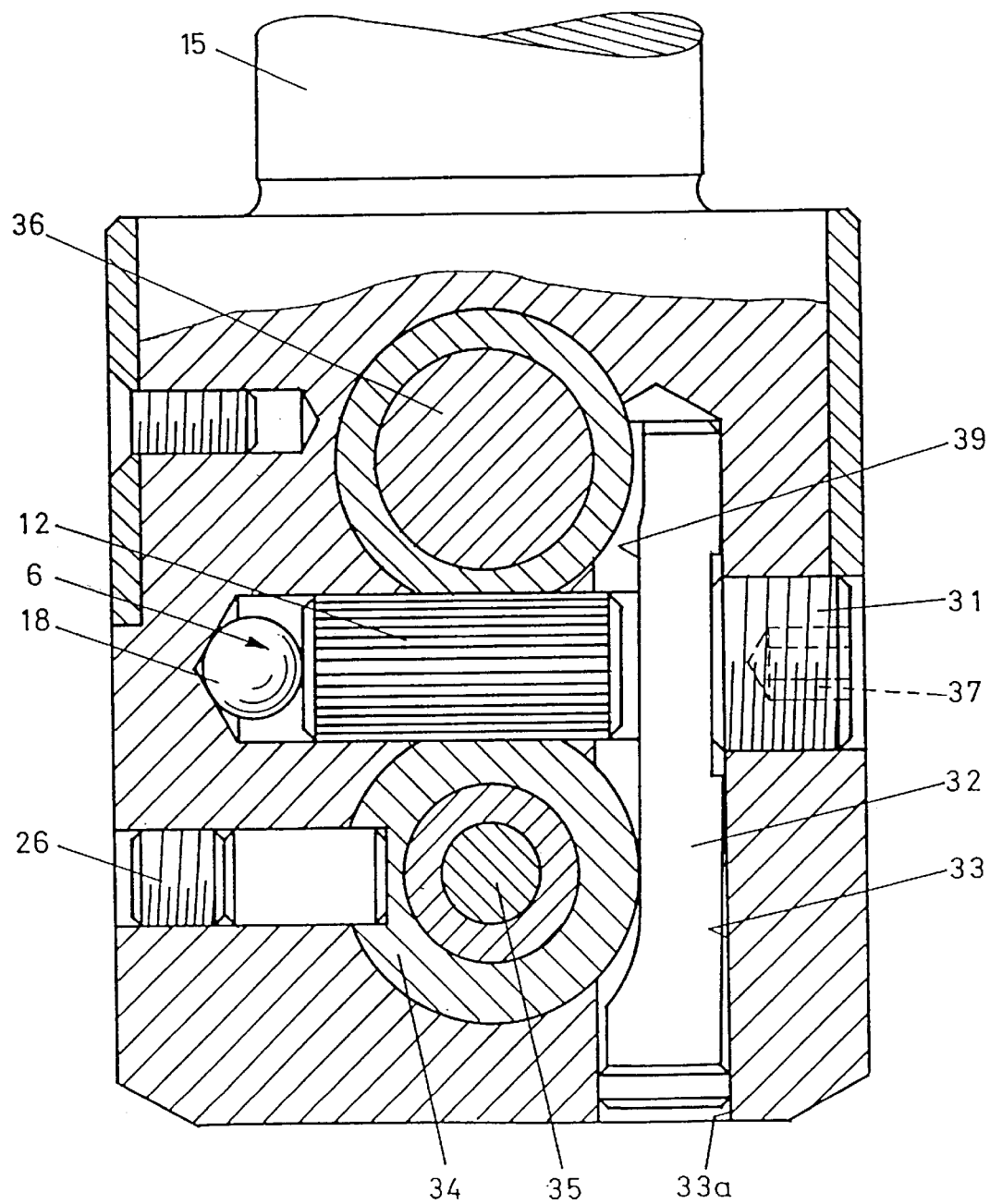
FIG. 5 shows a section through a boring head, according to an alternative embodiment of the present invention.

FIG. 5 shows a section through a boring head, according to an alternative embodiment of the present invention. In the embodiment shown in FIG. 5, tightening screw 31 exerts pressure on clamping bolt 32 transversely to its longitudinal direction. In order to rotate screw 31, screw 31 has a polygon-shaped recess 37. Clamping bolt 32 is guided in bore 33 of body 38 only at the start of bore 33a; otherwise, it has lateral play over its entire length in bore 33. Clamping bolt 32 can therefore rotate about a certain angle, the pivot point being at the start of bore 33a.

Clamping bolt 32 is provided with flattening 39 and lies with it on tool support 34.

The pressure generated by screw 31 is transmitted approximately in a ratio of 2:1 to tool support 34 as a result of which the latter is securely clamped. The higher pressure also causes a slight deformation of tool support 34 so that setting screw 35 is also locked. Clamping bolt 32 is designed in such a way that, in the unclamped state, a little play is present between clamping bolt 32 and counterweight 36. In this way, the clamping pressure is applied first and more strongly to tool support 34 and only subsequently —and to a weaker degree —to counterweight 36.

Clamping bolt 32 is so dimensioned that upon actuation of clamping screw 34, it is elastically deformed, and therefore a secure clamping of all moving parts is possible.

FIG. 5 shows clamping bolt 32 in a position in which counterweight 36 is not clamped. In the clamped state, screw 31 is turned farther into body 38 and, accordingly, clamping bolt 32 is pivoted to the left. Flattening 39 then lies on counterweight 36 under pressure.

This embodiment permits an especially selective well-defined division of the clamping forces upon the elements to be clamped.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A boring head, comprising:
   (a) a tool body;
   (b) a fine adjustment mechanism for adjusting position of a tool support;
   (c) a counterweight, mounted in the tool body;
   (d) a transmission device, adapted to automatically move the counterweight in an opposite direction upon movement of the tool support by the fine adjustment mechanism to provide imbalance compensation; and
   (e) a clamping organ adapted to engage with the tool support and the counter weight to simultaneously clamp the tool support and the counterweight when a setting for the fine adjustment mechanism is selected.

2. The boring head of claim 1, wherein the clamping organ is further adapted to clamp the fine movement mechanism simultaneously with the clamping of the tool support and the counterweight.

3. The boring head of claim 2, wherein the clamping organ clamps a setting screw of the fine movement mechanism.

4. The boring head of claim 3, wherein the clamping organ extends transversely to the axis of rotation of the boring head.

5. The boring head of claim 4, wherein the clamping organ has a screw that engages between the counterweight and the tool support and can be simultaneously laid against the counterweight and the tool support.

6. The boring head of claim 5, wherein the tool support is slotted such that a clamping force exerted on the tool support is transmitted to a setting screw of the fine movement mechanism.

7. The boring head of claim 6, wherein the transmission device has a cog roller that is rotatably mounted in the tool body and meshes with the counterweight and the tool support.

8. The boring head of claim 7, wherein the cog roller and the clamping organ are inserted in bores of the tool body running parallel to each other and transversely to the axis of rotation of the boring head.

9. The boring head of claim 8, further comprising a single cutting edge.

10. The boring head of claim 2, wherein the clamping organ has a screw that engages between the counterweight and the tool support and can be simultaneously laid against the counterweight and the tool support.

11. The boring head of claim 2, wherein the tool support is slotted such that a clamping force exerted on the tool support is transmitted to a setting screw of the fine movement mechanism.

12. The boring head of claim 2, wherein the transmission device has a cog roller that is rotatably mounted in the tool body and meshes with the counterweight and the tool support.

13. The boring head of claim 1, wherein the clamping organ extends transversely to the axis of rotation of the boring head.

14. The boring head of claim 13, wherein the clamping organ has a screw that engages between the counterweight and the tool support and can be simultaneously laid against the counterweight and the tool support.

15. The boring head of claim 13, wherein the tool support is slotted such that a clamping force exerted on the tool support is transmitted to a setting screw of the fine movement mechanism.

16. The boring head of claim 13, wherein the transmission device has a cog roller that is rotatably mounted in the tool body and meshes with the counterweight and the tool support.

17. The boring head of claim 1, wherein the clamping organ has a screw that engages between the counterweight and the tool support and can be simultaneously laid against the counterweight and the tool support.

18. The boring head of claim 17, wherein the tool support is slotted such that a clamping force exerted on the tool support is transmitted to a setting screw of the fine movement mechanism.

19. The boring head of claim 17, wherein the transmission device has a cog roller that is rotatably mounted in the tool body and meshes with the counterweight and the tool support.

20. The boring head of claim 1, wherein the tool support is slotted such that a clamping force exerted on the tool support is transmitted to a setting screw of the fine movement mechanism.

21. The boring head of claim 20, wherein the transmission device has a cog roller that is rotatably mounted in the tool body and meshes with the counterweight and the tool support.

22. The boring head of claim 1, wherein the transmission device has a cog roller that is rotatably mounted in the tool body and meshes with the counterweight and the tool support.

23. The boring head of claim 22, wherein the cog roller and the clamping organ are inserted in bores of the tool body running parallel to each other and transversely to the axis of rotation of the boring head.

24. The boring head of claim 1, further comprising a single cutting edge.

25. A boring head, comprising:
(a) a tool body;
(b) a fine adjustment mechanism for adjusting position of a tool support;
(c) a counterweight, mounted in the tool body;
(d) a transmission device, adapted to automatically move the counterweight in an opposite direction upon movement of the tool support by the fine adjustment mechanism to provide imbalance compensation; and
(e) a clamping organ adapted to simultaneously clamp the tool support and the counterweight, wherein the clamping organ has a screw that engages between the counterweight and the tool support and can be simultaneously laid against the counterweight and the tool support.

26. A boring head, comprising:
(a) a tool body;
(b) a fine adjustment mechanism for adjusting position of a tool support;
(c) a counterweight, mounted in the tool body;
(d) a transmission device, adapted to automatically move the counterweight in an opposite direction upon movement of the tool support by the fine adjustment mechanism to provide imbalance compensation; and
(e) a clamping organ adapted to simultaneously clamp the tool support and the counterweight, wherein the tool support is slotted such that a clamping force exerted on the tool support is transmitted to a setting screw of the fine movement mechanism.

27. A boring head, comprising:
(a) a tool body;
(b) a fine adjustment mechanism for adjusting position of a tool support;
(c) a counterweight, mounted in the tool body;
(d) a transmission device, adapted to automatically move the counterweight in an opposite direction upon movement of the tool support by the fine adjustment mechanism to provide imbalance compensation; and
(e) a clamping organ adapted to simultaneously clamp the tool support and the counterweight, wherein:
the transmission device has a cog roller that is rotatably mounted in the tool body and meshes with the counterweight and the tool support; and
the cog roller and the clamping organ are inserted in bores of the tool body running parallel to each other and transversely to the axis of rotation of the boring head.

* * * * *